United States Patent Office 3,467,529
Patented Sept. 16, 1969

3,467,529
PROCESS FOR PRODUCING A STABILIZED
READY - TO - EAT BREAKFAST CEREAL
PRODUCT
Joseph C. Muhler, Indianapolis, Ind., assignor to Indiana University Foundation, Blomington, Ind., a not-for-profit corporation of Indiana
No Drawing. Continuation-in-part of application Ser. No. 519,004, Jan. 6, 1966, which is a continuation of applications Ser. No. 265,032, Mar. 14, 1963, and Ser. No. 351,210, Mar. 11, 1964. This application Feb. 2, 1968, Ser. No. 702,544
Int. Cl. A23l 3/34
U.S. Cl. 99—153
10 Claims

ABSTRACT OF THE DISCLOSURE

The oxidative stability and other properties of a breakfast cereal product may be enhanced by including between about 0.5% and 1.5% of monosodium dihydrogen phosphase, $NaH_2PO_4$, disodium monohydrogen phosphate, $Na_2HPO_4$, or mixtures thereof, in the cereal particle.

CROSS-REFERENCE TO COPENDING APPLICATION

This application is a continuation-in-part of applicant's copending application Ser. No. 519,004, filed Jan. 6, 1966, which in turn was a continuation of applicant's then copending applications Ser. Nos. 265,032 and 351,210, filed Mar. 14, 1963, and Mar. 11, 1964, respectively, now abandoned.

BACKGROUND OF THE INVENTION

*Field of the invention.*—This invention relates to the manufacture of anticariogenic food products. More specifically, this invention is concerned with the manufacture of a sugar-containing comestible having a significantly reduced cariogenic potential.

*Description of the prior art.*—The prior art has long sought a means to compensate for the cariogenic potential of foods, particularly foods containing high preponderances of sweetening carbohydrates such as sucrose and other sugars. It has been theorized that when sugars are placed in the mouth, they give rise to the production of acids which promote dental caries.

A number of anticariogenic agents have been evaluated in the past in systems wherein the agent is applied or consumed topically (i.e., directly on the teeth) in the form of a dentifrice (e.g., a toothpaste or a toothpowder). However, knowledge gained on the anticariogenic effectiveness of agents used in such topical applications has not permitted prediction of efficacy for these anticariogenic agents in other applications, such as in foods, and particularly in foods containing a substantial portion of sugars, especially where the sugar is provided in the form of a coating for flavoring purposes.

By way of example, breakfast cereal products are often coated with sugars by spraying or otherwise applying a sugar syrup to the cereal material after the product issues from the cooking or baking steps. This form of cereal is highly favored by children. However, feeding studies indicate this sweetened type of cereal can give rise to an increase in the incidence of dental caries. A contributing cause to dental caries in children may be the adherence of sugars and their decomposition products to the dental plaque after ingestion, coupled with the slow rate of oral clearance, or the ability to produce high amounts of acid, or combinations of such factors.

Unfortunately, known anticariogenic agents have in general not provided any substantial degree of protection when used in foodstuffs. Thus, known anticariogenic agents such as fluorides, vitamin K, nitrofurans, ammonium compounds, iodoacetic acid and the like, when added separately to a foodstuff containing a high percentage of sugar, have little direct topical effect in a foodstuff environment and lose their anticariogenic effectiveness after ingestion.

SUMMARY OF THE INVENTION

In accordance with the present invention, it has been found that the incorporation of at least a minor, but anticariogenically effective, amount of monosodium dihydrogen phosphate, $NaH_2PO_4$, in comestibles, especially sugar-containing comestibles and sugar, reduces the cariogenic potential of the resulting combinations. The ingestion of such a comestible or of a tablet or capsule comprising at least about 50 milligrams monosodium dihydrogen phosphate, $NaH_2PO_4$, significantly reduces the incidence of dental caries. It has further been found that oxidative stability and other properties of a breakfast cereal product may be enhanced by incorporating therein between about 0.5% and 1.5% of monosodium dihydrogen phosphate, $NaH_2PO_4$, disodium monohydrogen phosphate, $Na_2HPO_4$, or mixtures thereof, in the cereal particle.

Among the objects achieved by the present invention is the provision of an anticariogenic agent that is effective in reducing the cariogenic potential of comestibles, especially those containing sugar or other carbohydrates.

Another object is to provide an anticariogenic agent that is effective in reducing the cariogenic potential of comestibles and sugar by gastrointestinal absorption and circulation through the system.

Yet another object of the present invention is to provide a new method for reducing the incidence of dental caries.

A still further object is the provision of new and useful methods for producing breakfast cereal products of superior quality and stability.

These and other objects, advantages, and features of the present invention will hereinafter appear, and, for purposes of illustration but not of limitation exemplary embodiments of the present invention are hereinafter described in detail.

DETAILED DESCRIPTION OF THE PREFERRED EMBODIMENTS

The present invention is predicated on the discovery that when monosidium dihydrogen phosphate, $NaH_2PO_4$, is incorporated in a comestible, especially sugar-containing comestibles and sugar, at a level of at least about 0.2% by weight, the cariogenic potential thereof is substantially reduced and the overall dental health of the individual is enhanced. Indeed, the regular ingestion of a tablet or capsule comprising at least about 50 mg. monosodium dihydrogen phosphate, $NaH_2PO_4$, provides an effective method of reducing the incidence of dental caries, particularly in individuals maintained on a dietary regimen having a high cariogenic potential.

The anticariogenic agent may be added directly to the comestible by admixture therewith. Where a comestible is sugar-coated at least a part of the $NaH_2PO_4$ is preferably provided in close proximity to the sugar coating. Thus, at least a part of the agent may be provided in the form of a coating in close proximity to the sugar coating. The procedure for incorporating the agent is not critical to this invention and the invention, therefore, is not restricted to any particular incorporation method. Indeed, substantially any method may be used to provide a food product in which sugar and $NaH_2PO_4$ are released together in the mouth to give a significant, system anticariogenic effect.

The term "sugar" as used herein should be understood to mean the class of monosaccharides or disaccharides in crystalline, liquid, or syrup form, suitable monosaccharides being fructose, dextrose, or glucose, such as corn sugar solids, and suitable disaccharides being lactose or sucrose, such as cane or beet sugar. The term "sugar" as used herein should also be understood to encompass starches that are broken down in the system into mono- or disaccharides.

As used herein, the term "comestible" should be understood to mean substantially any of the wide range of food products suitable for ingestion by humans including without limitation bakery products, candies, chewing gum, prepared beverages, fruit preparations, etc., and, especially, ready-to-eat breakfast cereal products. Sugars as hereinbefore defined are "comestibles" as well.

An unexpectedly high reduction in incidence of dental caries is achieved through the use of treated comestibles produced in accordance with the present invention. It has been found that $NaH_2PO_4$ used at the above-stated level not only inhibits the caries potential of the sweetened food product, but also reduces caries below the control level.

The mechanism whereby the anticariogenic agent operates is not fully understood, but it is believed that the presence of a significant proportion (i.e., an anticariogenic amount) of the $NaH_2PO_4$ with the sugar acts to inhibit the production of caries-promoting acids by the tacky, icchariferous flavoring material which sticks to the various crevices in the teeth and firmly adheres to the dental plaque. Advantageously, $NaH_2PO_4$ is soluble in water and acts systemically (i.e., as opposed to merely topically) on the teeth by means of salivary secretion. Therefore, even after the sugar residue adhering to the plaque is dissolved, the salivary glands in the mouth continue to release the $NaH_2PO_4$ agent for at least 48 hours following ingestion. While there is some topical contribution offered by the $NaH_2PO_4$, this would appear to be substantially dissipated in a period of about 15–30 minutes after ingestion, as is the case with other known anticariogenic agents which act topically. However, as distinguished from known anticariogenic agents such as fluorides, which are not secreted by the salivary glands, the agent of this invention appears to be absorbed by the system, recirculated and then secreted through the salivary glands.

The systemic effect of $NaH_2PO_4$ has been verified by the use of radioactivity tracer studies employing a radioactive phosphorus isotope. A sugar-coated ready-to-eat breakfast cereal containing radioactive $NaH_2PO_4$ was compared with a control cereal sample containing no $NaH_2PO_4$. The net number of counts per minute of the radioactive sample, relative to the control, established that the agent was present at an anticariogenic level over a period of 1 to 48 hours. Furthermore, enamel solubility reduction ("ESR"), as measured by the counts per minute of radioactive phosphate in an acid-dissolving solution in which the teeth were placed, showed a dramatic uptake of phosphate from the agent.

In accordance with a preferred aspect of the present invention, $NaH_2PO_4$ is supplied to a sugar-containing ready-to-eat breakfast cereal product at a level of at least about 0.2% by weight of the product. Where the breakfast cereal product is sugar-coated, at least a part of the $NaH_2PO_4$ is provided as a coating in close proximity to the sugar coating, the remainder being distributed throughout the cereal grain or particle generally. The agent may be incorporated in the sugar coating, or it may be sprayed onto the cereal grain before or after the sugar coating is applied. The manner of application of the $NaH_2PO_4$ is not controlling so long as at least a part of the phosphate is added in the proximity of the sugar coating.

The above-stated minimum concentration level (i.e., at least above 0.2% by weight of the food product) is the only operative limitation with respect to the amount of the agent that must be present. However, considerations other than operability (e.g., commercial or other considerations, such as taste), as a practical matter, do impose upper limits to the concentration of $NaH_2PO_4$ that is provided in the comestible product. A convenient upper limitation is about 1.5% $NaH_2PO_4$ by weight of the comestible product. It should be understood that comestibles containing $NaH_2PO_4$ at levels above the said upper limitation do exhibit anticariogenic effectiveness; however, such a food product is not as satisfactory from a taste standpoint as a comestible containing $NaH_2PO_4$ at a lower level.

The invention will now be described more specifically by reference to the following examples.

Example I 113.5 grams of $NaH_2PO_4$ were dissolved in 18 pounds of flavoring syrup consisting of water, sugar, salt, and malt syrup and the resulting mixture was added to 50 pounds of corn grits. The mixture was cooked using low pressure steam for 2½ hours and then dried to a moisture content of about 18%, tempered over-night, flaked, and toasted. The procedure was repeated using higher quantities of $NaH_2PO_4$, specifically, 227 grams and 340.5 grams. The final products had $NaH_2PO_4$ concentrations of, respectively, 0.5%, 1.0%, and 1.5%, by weight of the final product.

Example II 238 grams of $NaH_2PO_4$ were dissolved in 53 pounds of flavor syrup consisting of water, sugar, salt, and coloring, and the resulting mixture was added to 80 pounds of oat flour and 20 pounds of pregelatinized corn starch and agitated for 10 minutes. The resulting dough was then extruded into the desired shapes, dried to about 9% moisture, and puffed from a gun using high pressure steam. The procedure was repeated using higher quantities of $NaH_2PO_4$, specifically, 476 grams and 714 grams. The final products had concentrations of $NaH_2PO_4$ of, respectively, 0.5%, 1.0%, and 1.5%, by weight of the final product.

Example III 12.2 grams of $NaH_2PO_4$ were mixed with 6.1 pounds of wheat flour containing about 9% malted barley flour, 2.5 pounds of water, 38.9 grams of salt, and 1.7 grams of yeast, and the mixing continued for 8 minutes. The resulting dough was proofed for three hours and then baked for two hours. The loaf so produced was then shreeded and toasted before further grinding and sizing of the crumbs. The procedure given above was repeated using higher quantities of phosphate, specifically, 24.4 grams and 36.6 grams. The final products had concentrations of $NaH_2PO_4$ of, respectively, 0.5%, 1.0%, and 1.5% by weight of the final product.

Example IV 20 grams of $NaH_2PO_4$ were dissolved in 4 pounds 14 ounces of flavor syrup consisting of water, sugar, salt, and vanilla. Then, 5 pounds 12 ounces of oat flour, 312 grams of wheat flour, and 7.3 grams of calcium carbonate were added to the flavor syrup and mixed for 5 minutes. The resulting dough was then extruded and cut into cylindrical pellets, which were cooked using low pressure steam and then case-harded in an air oven for 2 minutes, flaked and toasted. The procedure given above was repeated using higher quantities of $NaH_2PO_4$, specifically, 40 grams and 60 grams. The final products had concentrations of $NaH_2PO_4$ of, respectively, 0.5%, 1.0%, and 1.5%, by weight of the final product.

Example V 40.5 grams of $NaH_2PO_4$ were dissolved in 6 pounds 4 ounces of flavor syrup consisting of water, sugar, salt, and malt syrup. The flavor syrup was then mixed with 16 pounds of yellow corn flour for 10 minutes. The resulting dough was extruded into ropes and cooked for 22 minutes using low pressure steam. The cooked dough was then re-extruded and cut into disc-shaped pellets. The pellets were dried, flaked, and oven-puffed at temperatures ranging from 400° F. to 480° F. The procedure given above was repeated using higher quantities of $NaH_2PO_4$, specifically, 81 grams and 121 grams. The final products had concentrations of $NaH_2PO_4$, of respectively, 0.5%, 1.0%, and 1.5% by weight of the final product.

Example VI

About 62.6 grams of $NaH_2PO_4$ were dissolved in 7 pounds of white sugar syrup. The heated sugar-phosphate syrup was then sprayed onto 7 pounds of corn flakes. The sugar-coated flakes were then dried by conventional means. The dried product contained about 1% $NaH_2PO_4$ by weight of the corn flakes (about 2% $NaH_2PO_4$ by weight of the sugar).

Example VII

About 47 grams of $NaH_2PO_4$ were dissolved in 11 pounds of sugar. This mixture was heated and then poured onto 4 pounds of wheat puffs. The product was tumbled in a drum until an even coating of sugar was applied to the puffs, and the coated product was then cooled. The $NaH_2PO_4$ level of the final product was 0.7% by weight of the product (0.9% by weight of the sugar-coating).

The anticariogenic efficacy of comestible products produced in accordance with the present invention has been verified by human clinical studies. In one such study, a total of 505 children ranging in age from 6 to 15 years were selected at random from Bloomington, Ind., school children and divided into two groups according to past dental caries history and dental age. All subjects received a thorough dental examination and their dental caries were evaluated by standard procedures. In order to eliminate bias, all examinations were conducted in a double blind manner with neither the examiner, the recorder, nor the patient aware of the treatment. The examinations were conducted immediately prior to the initiating of the study and at three, six, and twelve months, and projected for eighteen and twenty-four month intervals. At each examination, the existing dental caries were evaluated in terms of new decayed, missing, and filled (DMF) teeth and surfaces, severity, previously carious and noncarious teeth and reversals in diagnosis.

The two groups of children received the following treatments: Group 1 was the control and was provided with four commercially available presweetened (i.e., sugar-coated) cereals. These were honey-flavored puffed wheat cereal, alphabet oat cereal, sugar-coated corn flakes, and sugar-coated crisp rice. Group 2 received the same presweetened cereals to which had been added $NaH_2PO_4$ as follows: alphabet oat cereal 1.0% the first year, 0.5% the second year; sugar-coated corn flakes 1.0% the first year, 0.6% the second year; honey flavored puffed wheat 1.0% the first year, 0.8% the second year; sugar-coated crisp rice 0.5% the first year, 0.7% the second year (all percentages are expressed by weight of the cereal product). The cereals were packaged in unmarked, but coded packages and were distributed monthly by a technician.

In order to obtain an adequate number of subjects, the examiners discussed the proposed project in lay terms with the parents of each subject prior to the intitial examination. After the study commenced, especial efforts were made by all clinical personnel to avoid discussing any aspect of the conduct of the study with the parents of the children. Each parent was provided with a written summary of the nature of the study and an outline of the project in general terms along with personal instructions. Monthly cereal distribution was on and unannounced house-to-house basis with confiscation of all unused cereal in order to estimate patient consumption.

The six, twelve, eighteen, and twenty-four month test results recorded by two examiners for all subjects who completed the study at each stage are given in Table I. The date of Table I fully substantiates the anticariogenic effectiveness of the comestible products produced in accordance with the present invention.

TABLE I.—CLINICAL STUDY, BLOOMINGTON, INDIANA

[Test Results During a 24-Month Period for All Subjects Who Completed the Specified Portion of the Study]

| Cereal | Number of Subjects | DMFT Mean Increment | DMFT Percent Reduction | DMFS Mean Increment | DMFS Percent Reduction | Interprox Surfaces Mean Increment | Interprox Surfaces Percent Reduction |
|---|---|---|---|---|---|---|---|
| Examiner No. 1: | | | | | | | |
| 6-Month Data: | | | | | | | |
| Presweet Control | 178 | 0.99 | | 2.21 | | 1.01 | |
| Presweet and Agent | 169 | 0.85 | [1] 14.4 | 1.45 | 34.4 | 0.17 | [2] 83.2 |
| 12-Month Data: | | | | | | | |
| Presweet Control | 162 | 2.16 | | 5.33 | | 2.3 | |
| Presweet and Agent | 134 | 1.60 | [2] 25.9 | 3.03 | [3] 43.2 | 0.60 | [3] 74.9 |
| 18-Month Data: | | | | | | | |
| Presweet Control | 118 | 2.87 | | 7.37 | | 3.70 | |
| Presweet and Agent | 94 | 1.87 | [3] 34.8 | 4.28 | 4.19 | 1.41 | [3] 61.9 |
| 24-Month Data: | | | | | | | |
| Presweet Control | 120 | 4.42 | | 11.64 | | 6.62 | |
| Presweet and Agent | 83 | 2.88 | [3] 34.8 | 6.78 | [3] 41.8 | 3.05 | [3] 53.9 |
| Examiner No. 2: | | | | | | | |
| 6-Month Data: | | | | | | | |
| Presweet Control | 180 | 0.82 | | 2.09 | | 1.13 | |
| Presweet and Agent | 168 | 0.74 | [1] 9.8 | 1.48 | [2] 29.2 | 0.38 | [3] 66.4 |
| 12-Month Data: | | | | | | | |
| Presweet Control | 164 | 1.83 | | 4.70 | | 2.58 | |
| Presweet and Agent | 136 | 1.66 | [1] 9.3 | 3.42 | [3] 27.2 | 1.02 | [3] 60.5 |
| 18-Month Data: | | | | | | | |
| Presweet Control | 118 | 2.43 | | 5.66 | | 2.90 | |
| Presweet and Agent | 89 | 2.06 | [1] 15.2 | 4.44 | [2] 21.6 | 1.29 | [3] 55.5 |
| 24-Month Data: | | | | | | | |
| Presweet Control | 122 | 4.18 | | 9.76 | | 5.29 | |
| Presweet and Agent | 78 | 3.10 | [2] 25.8 | 7.34 | [4] 24.8 | 3.19 | [3] 39.7 |

[1] Not significant.
[2] Significant, probability less than 0.05.
[3] Significant, probability less than 0.005.
[4] Significant, probability less than 0.01.

In accordance with a further aspect of the present invention, monosodium dihydrogen phosphate, $NaH_2PO_4$, may be incorporated in sugar at a level of at least about 0.2% by weight of the sugar. The agent may be incorporated in the sugar in various points during the refining thereof, or it may be physically admixed with the resulting sugar product. The manner of incorporation of the $NaH_2PO_4$ agent is not controlling so long as the agent is dispersed throughout the sugar at the indicated minimum level.

The above-stated minimum concentration level (i.e., at least about 0.2% by weight) is the only operative limitation with respect to the amount of the agent that must be present. However, considerations other than operability (e.g., considerations such as taste), as a practical matter do impose upper limits to the concentration of $NaH_2PO_4$ that is provided in the sugar. A convenient upper limitation is about 1.5% $NaH_2PO_4$ by weight of the sugar, although it should be understood that sugar containing $NaH_2PO_4$ at levels above the said upper limitation do exhibit anticariogenic effectiveness. The following is an exemplary composition produced in accordance with this aspect of the present invention.

EXAMPLE VIII

| Constituent: | Percent by wt. |
|---|---|
| Sucrose | 99.5 |
| Monosodium dihydrogen phosphate, $NaH_2PO_4$ | 0.5 |

Yet another preferred aspect of the present invention involves the discovery that the ingestion of monosodium dihydrogen phosphate in dosage unit form (i.e., as a tablet or a capsule comprising at least about 50 milligrams and preferably about 300 milligrams of $NaH_2PO_4$) significantly improves the dental health of the individual ingesting such tablet or capsule on a regular basis such that the overall incidence of dental caries by the individual is substantially and significantly reduced. Best results are achieved where the individual in question is maintained on a dietary regimen having a substantial cariogenic potential (i.e., as a diet comprising a high proportion of sugars and other carbohydrates).

The $NaH_2PO_4$ in such a tablet or capsule may be associated with physiologically inert, nontoxic filler such as manitol, and may further contain flavoring agents and coloring agents as will be obvious to those skilled in the art. Alternatively, $NaH_2PO_4$ may be the only constituent of such a tablet or capsule. What is important is that the minimum amount of $NaH_2PO_4$ be provided to the recipient on a regular basis.

The effectiveness of such $NaH_2PO_4$ containing capsule and tablet has been verified in a human dental caries clinical study. A total of about 1200 schoolchildren aged 6 to 15 years and residing in a nonfluoride area were divided into four groups of at least 250 each. The subjects were examined and assigned at random to the different groups based on dental age and past dental caries experience. Each child was independently examined by each of the two clinical investigators. The children in Group 1 received a chewable tablet containing 100 milligrams monosodium dihydrogen phosphate, $NaH_2PO_4$, and these children were instructed to thoroughly chew one tablet immediately prior to each meal. The children in this group were provided with a supply of sugar-coated breakfast cereals and were instructed to eat them regularly. Children in Group 2 were provided a supply of gelatin capsules containing 300 milligrams monosodium dihydrogen phosphate, $NaH_2PO_4$, these children being instructed to swallow one tablet each day, preferably immediately after arising. The children were likewise provided with a supply of sugar-coated breakfast cereal and were asked to eat the cereals regularly. Children in Group 3 were provided with sugar-coated breakfast cereal to which 0.5%–0.8% monosodium dihydrogen phosphate, $NaH_2PO_4$, had been added. These children received a placebo tablet and were provided with a supply of the sugar-coated cereals to which monosodium dihydrogen phosphate, $NaH_2PO_4$, had not been added. Group 4 thus serves as a control group. Children were re-examined, utilizing a complete examination and a 5 or 7 film bitewing radiograph evaluation, in order to ascertain their dental caries experience under the conditions of the study. The six month results achieved by the two examiners are reported in Table II. As noted in Table II, each of the examiners found that substantial caries reductions were achieved for all three experimental groups, with the greatest results being achieved by those groups ingesting $NaH_2PO_4$ in tablet or capsule form.

TABLE II.—CLINICAL STUDY, GOSHEN, INDIANA

[Test Results During a 6-Month Period for All Subjects Who Completed This Portion of the Study]

| Treatment | Number of subjects | DMFT Mean Increment | DMFT Percent Reduction | DMFS Mean Increment | DMFS Percent Reduction | Interprox. Surfaces Mean Increment | Interprox. Surfaces Percent Reduction |
|---|---|---|---|---|---|---|---|
| Agent In— | | | | | | | |
| Examiner No. 1: | | | | | | | |
| Tablets | 219 | 0.54 | [1] 50.9 | 1.51 | [1] 43.2 | 0.59 | [1] 68.4 |
| Capsules | 218 | 0.37 | [1] 66.4 | 1.06 | [1] 60.2 | 0.31 | [1] 83.4 |
| Cereal | 211 | 0.65 | [1] 40.9 | 1.52 | [1] 42.9 | 0.76 | [1] 59.4 |
| Control | 203 | 1.10 | | 2.66 | | 1.87 | |
| Examiner No. 2: | | | | | | | |
| Tablets | 219 | 1.50 | [1] 27.2 | 3.45 | [1] 24.8 | 0.66 | [1] 64.5 |
| Capsules | 218 | 1.28 | [1] 37.9 | 2.88 | [1] 37.3 | 0.32 | [1] 82.8 |
| Cereal | 211 | 1.64 | [2] 20.4 | 3.34 | [1] 27.2 | 0.76 | [1] 59.1 |
| Control | 204 | 2.07 | | 4.59 | | 1.86 | |

[1] Significant, probability less than 0.005.
[2] Significant, probability less than 0.05.

The constituents of exemplary tablets and capsules produced in accordance with the present invention are given in the following examples.

Example IX

| Constituent: | Milligrams |
|---|---|
| Monosodium dihydrogen phosphate | 150 |
| Fillers, flavorings, colorings, etc. | Bal. |

Example X

| Constituent: | Milligrams |
|---|---|
| Monosodium dihydrogen phosphate gelatin capsule | 150 |
| Fillers, flavorings, colorings, etc. | Bal. |

The $NaH_2PO_4$ agent of the present invention exhibits anticariogenic effectiveness in nonsugar containing comestibles as well as in sugar-containing comestibles. Such comestibles may contain nonnutritive artificial sweetening agents (e.g., sacchrain, sodium and calcium salts of saccharin, sodium and calcium cyclamates, and the like) for flavoring or sweetening purposes. The effectiveness of $NaH_2PO_4$ in the presence of artificial sweeteners (i.e., in the absence of sugars) has been demonstrated by the following laboratory study involving rats, standard experimental animals for anticariogenic purposes. Test rats were divided into four equal groups, and each group was given a stock cariogenic diet. In addition, the animals of each group except the control group were maintained on a drinking water regimen comprising $NaH_2PO_4$ at a 1% level by weight of the drinking water together with an appropriate amount of the sweetening agent (0.14% in the case of sodium saccharin and "Sucryl"[1] and 10% in the case of sucrose for comparison purposes). In addition, one group received distilled water as a drinking regimen and thus served as a control group. After the termination of the study period, the animals were sacrified, and enamel solubility values for the teeth were determined in a conventional manner. These data are given in TABLE III.

TABLE III

| Drinking Water Regimen | | ESR Data, Mean Percent Reduction |
|---|---|---|
| Anticariogenic Agent, Percent | Sweetener, Percent | |
| Control | None | |
| 1.0% NaH$_2$PO$_4$ | 10% sucrose | 14.47 |
| 1.0% NaH$_2$PO$_4$ | 0.14% sodium saccharin | 24.48 |
| 1.0% NaH$_2$PO$_4$ | 0.4% "Sucryl" | 16.55 |

The data of Table III verify the effectiveness of NaH$_2$PO$_4$ in the presence of artificial sweeteners as well as in the presence of nutritive sweeteners such as sucrose.

While the invention has been described with reference to NaH$_2$PO$_4$, it should be understood that the term monosodium dihydrogen phosphate, as utilized in the claims hereof, is intended to encompass compositions which, even though buffered, flavored, or otherwise treated, upon reaction, such as cooking, yield NaH$_2$PO$_4$ in the ultimate comestible product.

While monosodium dihydrogen phosphate is the active agent in accordance with which the cariogenic potential of sugar-containing comestibles may be reduced, other agents [i.e., disodium monohydrogen phosphate (Na$_2$HPO$_4$)] may advantageously be provided in combination with the monosodium salt in order to make the resulting comestible more palatable. However, it should be understood that it is the monosodium salt alone that contributes to the anticariogenic efficacy of the resultant comestible product and that an organoleptic agent such as Na$_2$HPO$_4$ may even diminish, to an extent, the overall anticariogenic efficacy of the monosodium salt. Nevertheless, a balance must be achieved between anticariogenic effectiveness and the taste of the comestible product so that consumers do not avoid the treated product because of adverse taste considerations. For that reason, commercially practicable comestibles produced in accordance with the present invention will in many cases contain a mixture of the monosodium and disodium salts.

For the same reason (i.e., on account of taste considerations), a sugar-coated comestible, such as a presweetened cereal, while having at least a part of the NaH$_2$PO$_4$ in close proximity to the sugar coating, may advantageously have NaH$_2$PO$_4$ distribted throughout the core of the sugar-coated cereal grain.

Other new and useful attributes of breakfast cereal products produced in accordance with the present invention have also been observed. It has been found, and forms another object of this invention, that a reduction in oxidative rancidity of a breakfast cereal product may be achieved by including between about 0.5% and 1.5% of an inorganic orthophosphate in a cereal particle. In the case of a sugar-coated cereal, the agent may be incorporated in whole or in part in the sugar coating.

The orthophosphates which are operable to reduce the oxidative rancidity of breakfast cereal products are members of the class consisting of monosodium dihydrogen phosphate, NaH$_2$PO$_4$, disodium monohydrogen phosphate, Na$_2$HPO$_4$, and mixtures thereof. In the event mixtures or blends of the phosphates are used, it is preferred that they be blended in proportions from about 76% to 74% of the monosodium salt with 24% to 53% of the disodium salt. As stated above, the total phosphate content may vary from 0.5% to about 1.5%, the percentage being by weight and based on the weight of the total composition.

In order to determine the stability of a breakfast cereal product against oxidative rancidity, the following test procedure was carried out. Samples to be tested were sealed in a glass jar with a metal screw cap. Three such samples were placed in an oven maintained at a constant temperature of 113° F. Each sample was tested daily for rancid odors. The time taken for each sample to become rancid was noted. When all three of the samples had become rancid, the average time in days was calculated. Results are reported as the number of days necessary for samples to become rancid at the temperature of the test.

The following examples illustrate the effectiveness of inorganic orthophosphates in increasing the stability of breakfast cereal products against oxidative rancidity.

Example XI

A cereal dough was prepared by mixing 30 pounds of 80% oat flour—20% corn flour blend with 15.9 pounds of a flavoring syrup having the following composition:

| | Percent |
|---|---|
| Water | 75.92 |
| Liquid sugar (69% solids) | 6.63 |
| Salt brine (saturated) | 17.38 |
| Color | 0.07 |

After thorough mixing, the material was extruded, pelletized into alphabet letter form, and dried for 4 minutes at 260° F. The pellets were then tempered for about 20 minutes and puffed in a cereal puffing gun at 170 p.s.i. (pounds per square inch) after preheating for 56 seconds at 350° F. Liquid brown sugar of 67.5° Brix was heated to 232° F. and poured over a 5-pound quantity of the puffs as prepared as described above. They were allowed to tumble in a reel heated to 200° F. until they became free-running. The product was then dried for 4 minutes at 280° F.

The above example was repeated (except that 137.1 grams NaH$_2$PO$_4$ and 170.9 grams Na$_2$HPO$_4$ were added to the flavoring syrup used to prepare the cereal dough. In addition, 21.6 grams of NaH$_2$PO$_4$ and 7.8 grams of Na$_2$HPO$_4$ were added to the brown sugar syrup used to coat the puffs. The resulting product contained 1.0 weight percent of total phosphate, dry basis, from a blend of 47% monosodium salt and 53% disodium salt.

When subjeced to the oxidative stability test as described above, the cereal puffs which did not contain phosphate became rancid after 29 days, whereas the phosphate containing samples became rancid only after 51 days.

Example XII

A cereal dough was prepared by mixing 30 pounds of a blend of 80% oat flour, 15% corn flour, and 5% wheat flour with 15.9 pounds of the flavoring syrup described in connection with Example XI above. After thorough mixing, the flavored dough was extruded, pelletized into the desired form, and dried for 4 minutes at 260° F. The pellets were then tempered for about 20 minutes and puffed in a puffing gun at 170 p.s.i. after preheating for 56 seconds at 350° F. Five pounds of a liquid brown sugar of 67.5° Brix was heated to 232° F. and poured over 5 pounds of the puffs and prepared as described above. The puffs were then allowed to tumble in a reel heated to 200° F. until they become free-running. The product was then dried for 4 minutes at 280° F.

A second cereal sample was prepared in accordance with the same procedure, except that 137.1 grams of NaH$_2$PO$_4$ and 170.9 grams of Na$_2$HPO$_4$ were added in the flavoring syrup used to prepare the cereal dough, and 21.6 grams of NaH$_2$PO$_4$ and 7.8 grams of Na$_2$HPO$_4$ were added in the brown sugar coating syrup. The resulting product contained 1.0 weight percent of total phosphate,

---

[1] "Sucryl" is a registered trademark of Abbott Laboratories for a nonnutritive artificial sweetening agent comprising sodium cyclamate and sodium saccharine.

dry basis, from a blend of 47% $NaH_2PO_4$ and 53% $Na_2HPO_4$.

When subjected to the oxidative stability test as described above, the cereal containing the phosphate added was stable for a total of 31 days. In contrast, the control sample gave evidence of rancidity after 27 days.

Example XIII

Fifty pounds of parboiled rice was precooked for 25 minutes at 15 p.s.i.g. using direct steam pressure. Pressure was released and to the rice was added 19.56 pounds of a flavoring syrup having the following composition:

|  | Percent |
|---|---|
| Water | 24.77 |
| Liquid sugar (69% solids) | 44.57 |
| Corn syrup (42° Baumé) | 3.57 |
| Salt brine (saturated) | 27.09 |

The mixture of rice and flavoring syrup was mixed for 15 minutes and then again cooked at 15 p.s.i.g. for 55 minutes. The cooked rice was allowed to dry for 25 minutes at 225° F. and then tempered overnight. After tempering, the product was rolled lightly between steel rollers and toasted at 450° F. for 90 seconds.

The above example was repeated exactly, except that 369.5 grams of $NaH_2PO_4$ and 132.5 grams of $Na_2HPO_4$ were added to the flavoring syrup. The resulting product contained 1.0 weight percent of total phosphate, dry basis, from a blend of 70% monosodium salt and 30% disodium salt.

Samples of the product with and without the phosphate added were subjected to the previously described oxidative stability test. The rice product without phosphate became rancid after 52 days' storage, whereas the product containing phosphate had not become rancid at the conclusion of the test, that is, after 153 days.

Example XIV

Fifty pounds of corn grits were cooked with 18.2 pounds of a flavoring syrup having the following composition:

|  | Percent |
|---|---|
| Water | 33.53 |
| Liquid sugar (69% solids) | 31.79 |
| Malt syrup | 2.15 |
| Iron sulphate | 0.02 |
| Salt brine (saturated) | 32.51 |

Cooking was continued at 18 p.s.i. for 2½ hours. The grits were then dried at 225° F. for 35 minutes. After tempering overnight, they were flaked and toasted at 500° F. for 90 seconds. Five pounds of liquid white sugar of 65.5° Brix heated to 232° F. until they became free-flowing and was then dried for 4 minutes at 270° F.

The corn flakes prepared as described above, when subjected to the oxidative stability test, required 43 days to become rancid.

The example was repeated exactly, excepting that 176.6 grams of $NaH_2PO_4$ and 63.4 grams of $Na_2HPO_4$ were added. Nine and three tenths grams of $NaH_2PO_4$ and 11.6 grams of $Na_2HPO_4$ were added to the liquid white sugar used to coat the toasted flakes. The resulting product contained 1.0 weight percent of total phosphate, dry basis, from a blend of 67% monosodium salt and 33% disodium salt.

The sample containing phosphate was subjected to the oxidative stability test described above and had not become rancid at the termination of the test (i.e., after 153 days).

Example XV

One thousand seven hundred pounds of corn grits was placed in a rotating pressure cooker with 632 pounds of a flavoring syrup having the following formulation:

|  | Percent |
|---|---|
| Water | 33.53 |
| Liquid sugar (69% solids) | 31.79 |
| Malt syrup | 2.15 |
| Iron sulphate | 0.02 |
| Salt brine (saturated) | 32.51 |

The mixture was cooked for 2½ hours at 18 p.s.i.g. using live steam. After cooking, the grits were dried at 180° F. to a moisture content of 18%. They were then tempered for 5 hours, flaked, and toasted at 500° F. for 90 seconds. The toasted flakes were then cooled to room temperature.

The procedure described above was repeated using in the flaviring syrup 12.87 pounds of $NaH_2PO_4$ and 4.07 pounds of $Na_2HPO_4$. The resulting product contained 1.0 weight percent of total phosphate, dry basis, of 76% $NaH_2PO_4$ and 24% $Na_2HPO_4$.

Samples of the corn flakes with and without added phosphate were subjected to the oxidative stability test described above. The control sample became rancid at the end of 25 days. The sample containing added phosphate was stable for 30 days.

Example XVI 0.66 pound of yeast was dissolved in 2½ quarts of lukewarm water. This solution was added to 420 pounds of water and dispersed therein. To this dispersion there was added 5.5 grams of a saturated salt brine (55 pounds of salt) and 1,055 pounds of a blend of 80% wheat flour and 20% malted barley flour. The total mass was mixed in a dough mixer for 8 minutes, allowed to stand for 4 hours, and formed into loaves of 9 pounds each. These were baked for 2 hours in a Baker-Perkins oven at 400° F. After baking, the loaves were shredded, dried for 5 hours at 240° F., and ground using corrugated rollers. The product was then graded through 4½ mesh and on a 26 mesh U.S. Standard sieve.

This procedure was repeated, except that 86 pounds of a solution containing 42.99% water, 11.44% of a blend of 47% $NaH_2PO_4$ and 53% $Na_2HPO_4$ and 45.57% sucrose was added to the 420 pounds of water. The resulting product contained 1.0 weight percent of total phosphate, dry basis, from a blend of 47% monosodium salt and 53% disodium salt.

The cereals prepared as described above were subjected to the above-described oxidative stability test. The sample without phosphate became rancid after 29 days, whereas the cereal containing phosphate was not rancid at the termination of the test (i.e., after 153 days).

Example XVII

Fifty pounds of cracked white wheat were cooked with one pound of water for 50 minutes at 15 p.s.i. To this was added 27.21 pounds of a flavoring syrup having the following composition:

|  | Percent |
|---|---|
| Water | 53.94 |
| Enzyme (amylase) | 0.02 |
| Malted barley flour | 15.00 |
| Wheat flour | 18.34 |
| Salt brine (saturated) | 12.70 |

The mixture was blended thoroughly and cooked for 20 minutes at 15 p.s.i. After cooking, the grits were dried at 225° F. for 10 minutes and then milled to an even particle size in an attrition mill. The product was tempered overnight, preheated for 15 seconds at 210° F., flaked and then toasted at 330° F. in a traveling screen oven. The toasted flakes were then coated in 10-pound batches with 1.6 pounds of a white sugar coating syrup per 10-pound batch which had been heated to 180° F. and sprayed at 40 p.s.i. through a 0.062 inch pressure atomizing nozzle. The batches were then dried at 270° F. for 4 minutes.

The above procedure was repeated, except that the flavoring syrup contained 101.0 grams of $NaH_2PO_4$ and 126 grams of $Na_2HPO_4$. The resulting product contained 1.0% by weight, based on the weight of the finished dry product, of a blend of 47% $NaH_2PO_4$ and 53% $Na_2HPO_4$.

Samples of the products prepared as described above were subjected to the oxidative stability test previously described. The control samples became rancid after 44 days. The samples containing phosphate became rancid only after 71 days.

Example XVIII 28.5 pounds of white wheat, 9 pounds, 15 ounces of Bran and 21 pounds, 9 ounces of a flavoring syrup were cooked for one hour at 15 p.s.i. in a pressure cooker. The flavoring syrup had the following composition:

| | Percent |
|---|---|
| Water | 30.83 |
| Wheat flour | 3.58 |
| Malted barley | 1.19 |
| Cereal fines | 1.19 |
| Salt brine (saturated) | 16.02 |
| Liquid sucrose (69% solids) | 47.19 |

After cooking, the batch was tempered overnight, heated to 210° F. for 30 seconds, flaked and toasted in a traveling screen oven at 310° F.

The described procedure above was repeated, except that the flavoring syrup contained 170.9 grams of $NaH_2PO_4$ phosphate and 55.1 grams of $Na_2HPO_4$. The finished product contained 1.0 weight percent, dry basis, of a blend of 76% monosodium salt and 24% disodium salt.

When subjected to the oxidative stability test described above, the control sample became rancid after 29 days. The sample containing the phosphate blend became rancid only after 37 days.

Example XIX

To 100 pounds of blended flour (81.06% oat flour, 9.35% wheat flour, 9.36% soy flour and 0.23% calcium carbonate) 54 pounds of a flavoring syrup having the following composition was added:

| | Percent |
|---|---|
| Water | 7.20 |
| Liquid sugar (69% solids) | 62.73 |
| Salt brine (saturated) | 23.52 |
| Malt syrup (42° Baumé) | 6.20 |
| Vanilla extract | 0.29 |
| Vitamins | 0.06 |

The mix was blended in a dough mixer for 5 minutes and cooked for 10 minutes in a continuous cooker using 14 p.s.i.g. steam pressure. The cooked dough was then extruded and cut into pellets which were dried at 275° F. for 4 minutes, flaked and toasted at 300° F. for 4 minutes. The product was segregated by passing through a one-inch square mesh screen and being retained on a one-eighth inch square mesh screen.

The procedure above was repeated, except that the flavoring syrup contained enough of a blend of 47% $NaH_2PO_4$ and 53% $Na_2HPO_4$ to result in a final product containing 1.0 weight percent total phosphate, dry basis.

These samples were then subjected to the oxidative stability test. The control sample, that is, those oat flakes which did not contain phosphate, became rancid after 44 days. The sample containing the phosphate became rancid only after 122 days.

The oxidative stability data for Examples XI–XIX above are set out in Table IV.

TABLE IV.—OXIDATIVE STABILITY (113° F.)

| Cereal | Total Phosphate, percent | Ratio: percent Mono to di | Days to Rancidity Without Phosphate | Days to Rancidity With Phosphate |
|---|---|---|---|---|
| Example XI | 1.0 | 47:53 | 29 | 51 |
| Example XII | 1.0 | 47:53 | 27 | 31 |
| Example XIII | 1.0 | 70:30 | 52 | >153 |
| Example XIV | 1.0 | 67:33 | 43 | >153 |
| Example XV | 1.0 | 76:24 | 25 | 30 |
| Example XVI | 1.0 | 47:53 | 29 | >153 |
| Example XVII | 1.0 | 47:53 | 44 | 71 |
| Example XVIII | 1.0 | 76:24 | 29 | 37 |
| Example XIX | 1.0 | 47:53 | 44 | 122 |

An examination of the data set out in Table IV verifies the oxidative stabilizing effect of the instant inventive concept. In all cases the inclusion of the phosphate markedly improved the stability of the product against oxidative rancidity.

Example XX

Malted wheat flakes were prepared in accordance with the procedure described in Example XVII. Various amounts of $NaH_2PO_4$, $Na_2HPO_4$, and blends thereof were added to the flavoring syrup. In addition to the control sample which did not contain phosphate, samples were prepared which contained the following:

(a) 0.5 weight percent, dry basis, of $NaH_2PO_4$;
(b) 0.5 weight percent, dry basis, of $Na_2HPO_4$;
(c) 0.5 weight percent, dry basis, of a blend of 47% $NaH_2PO_4$ and 53% $Na_2HPO_4$;
(d) 1.0 weight percent, dry basis, of a blend of 47% $NaH_2PO_4$ and 53% $Na_2HPO_4$;
(e) 1.5 weight percent, dry basis, of $NaH_2PO_4$;
(f) 1.5 weight percent, dry basis, of $Na_2HPO_4$;
(g) 1.5 weight percent, dry basis, of a blend of 47% $NaH_2PO_4$ and 53% $Na_2HPO_4$.

These samples were subjected to the oxidative stability test described above. Test results are set forth in Table V.

Example XXI

The sweetened puffed oat letters of Example XI were reformulated containing the various percentages of $NaH_2PO_4$, $Na_2HPO_4$, and blends thereof as described in connection with Example XX. Oxidative stability data on these samples are set out in Table V.

Example XXII

The corn flakes of Example XV were reformulated using the various percentages of the phosphates as described in connection with Example XX. In this instance, however, the blends used were 76% $NaH_2PO_4$ and 24% $Na_2HPO_4$. Oxidative stability data on these samples are reported in Table V.

Example XXIII

The sugar-coated puffed rice product of Example XIII was reformulated using the various amounts of phosphates as described in Example XXI. The blends used in this instance, however, contained 70% $NaH_2PO_4$ and 30% $Na_2HPO_4$. Oxidative stability data are set forth in Table V.

TABLE V—OXIDATIVE STABILITY (113° F.)

| | Control | 0.5 Mono | 0.5 Di | 0.5 Blend | 1.0 Blend | 1.5 Mono | 1.5 Di | 1.5 Blend | Blend Ratio, Percent Mono-Di |
|---|---|---|---|---|---|---|---|---|---|
| Example XVII | 34 | 41 | 55 | 60 | 65 | 55 | 66 | 71 | 47:53 |
| Example XVIII | 35 | 35 | 63 | 39 | 46 | 37 | 63 | 63 | 47:53 |
| Example XIX | 23 | 107 | 101 | 101 | 101 | 106 | 78 | 88 | 76:24 |
| Example XX | 32 | 39 | 46 | 52 | 40 | 39 | 47 | 39 | 70:30 |

The data of Table V verify that the inclusion of $NaH_2PO_4$, $Na_2HPO_4$, or mixtures thereof in a breakfast cereal product markedly improves the oxidative stability of the products relative to a control sample.

It has also been observed that the addition of inorganic orthophosphates to breakfast cereal products results in improved cooking procedures and improved control of color of cooked cereal grains and doughs. It has been found and forms a further object of this invention that cooked cereal grains and cooked cereal doughs may be prepared in an improved manner by incorporating in the processing step from 0.5% to 1.5% of a member selected from the group consisting of $NaH_2PO_4$, $Na_2HPO_4$, and mixtures thereof. The inclusion of the inorganic phosphate results in a more uniform cooking procedure giving a lower percentage of raw or uncooked cereal particles in the case of cereal grains and resulting in a more uniform desirable color than cereals prepared without the orthophosphates being present, as illustrated in the following examples.

Example XXIV 1,700 pounds of corn grits were placed in a rotating pressure cooker with 632 pounds of a flavoring syrup having the following formulation:

| | Percent |
|---|---|
| Water | 33.53 |
| Liquid sugar (69% solids) | 31.79 |
| Malt syrup | 2.15 |
| Iron sulphate | 0.02 |
| Salt brine (saturated) | 32.51 |

The mixture was cooked for 2½ hours at 18 p.s.i.g. using live steam. After cooking, the grits were dried at 180° F. to a moisture content of 19%. They were then tempered for 5 hours, flaked, and toasted at 500° F. for 90 seconds. The toasted flakes were then cooled to room temperature.

The procedure described above was repeated using 12.87 pounds of $NaH_2PO_4$ and 4.07 pounds of $Na_2HPO_4$ in the flavoring syrup. The resulting product contained 1.0 weight percent of total phosphate, dry basis, from a blend of 76% monosodium salt and 24% disodium salt.

In comparing the two products, it was observed that the presence of phosphates resulted in a more uniform cook with less evidence of raw centers in the grits when phosphates were present. The flankes made from the grits containing phosphates had a more uniform yellow color than those made from the control sample without phosphates.

Example XXV

A cereal dough was prepared by mixing 30 pounds of 80% oat flour—20% corn flour blend with 15.9 pounds of a flavoring syrup having the following composition:

| | Percent |
|---|---|
| Water | 75.92 |
| Liquid sugar (69% solids) | 6.63 |
| Salt brine (saturated) | 17.38 |
| Color | 0.07 |

After thorough mixing, the material was extruded, pelletized to the desired letter form, and dried for 4 minutes at 260° F. The pellets were then tempered for about 20 minutes and puffed in a cereal puffing gun at 170 p.s.i. after preheating for 56 seconds at 350° F. Liquid brown sugar of 67.5° Brix was heated to 232° F. and poured over a 5-pound quantity of the puffs as prepared as described above. The coated cereal was allowed to tumble in a reel heated to 200° F. until it became free-running. The product was then dried for 4 minutes at 280° F.

The above example was repeated, except that the flavoring syrup used to prepare the cereal dough contained 137.1 grams of $NaH_2PO_4$ and 170.9 grams of $Na_2HPO_4$. In addition, 21.6 grams of $NaH_2PO_4$ and 7.8 grams of $Na_2HPO_4$ were added to the brown sugar syrup used to coat the puffs. The resulting product contained 1.0 weight percent of total phosphate, dry basis, from a blend of 47% monosodium salt and 53% disodium salt.

The samples prepared in accordance with the concept of the invention were more easily prepared than the control samples in that the cooking and the extrusion of the dough proceeded more smoothly. The finished product, after toasting, had a lighter cream-pink appearance with much less tendency to develop a scorched or burnt appearance than the control samples.

Example XXVI

Fifty pounds of cracked white wheat was cooked with one pound of water for 50 minutes at 15 p.s.i. To this was added 27.21 pounds of a flavoring syrup having the following composition:

| | Percent |
|---|---|
| Water | 53.94 |
| Enzyme (amylase) | 0.02 |
| Malted barley flour | 15.00 |
| Wheat flour | 18.34 |
| Salt brine (saturated) | 12.70 |

The mixture was blended thoroughly and cooked for 20 minutes at 15 p.s.i. After cooking, the grits were dried at 225° F. for 10 minutes and then milled to an even particle size in an attrition mill. The product was tempered overnight, preheated for 15 seconds at 210° F., flaked, and then toasted at 330° F. in a traveling screen oven. The toasted flakes were then coated in 10-pound batches with 1.6 pounds of a white sugar coating syrup per 10-pound batch which had been heated to 180° F. and sprayed at 40 p.s.i. through a 0.062 inch pressure atomizing nozzle. The batches were then dried at 270° F. for 4 minutes.

The above procedure was then repeated, except that the flavoring syrup contained 101.0 grams of $NaH_2PO_4$ and 126 grams of $Na_2HPO_4$. The resulting product contained 1.0% by weight, based on the weight of the finished product, of a blend of 47% monosodium salt and 53% disodium salt.

The presence of phosphate reduced substantially the amount of raw uncooked material and allowed the grits to cook more smoothly as compared with the control samples. In addition, the finished product with added phosphate had a more uniform golden-brown color than the control sample.

Example XXVII

Fifty pounds of parboiled rice was precooked for 25 minutes at 15 p.s.i.g. using direct steam pressure. Pressure was released and to the rice was added 19.56 pounds of a flavoring syrup having the following composition:

| | Percent |
|---|---|
| Water | 24.77 |
| Liquid sugar (69% solids) | 44.57 |
| Corn syrup (42° Baumé) | 3.57 |
| Salt brine (saturated) | 27.09 |

The mixture of rice and flavoring syrup was mixed for 15 minutes and then again cooked at 15 p.s.i.g. for 55 minutes. The cooked rice was allowed to dry for 25 minutes at 225° F. and then tempered overnight. After tempering, the product was rolled lightly between steel rollers and toasted at 450° F. for 90 seconds.

The above example was repeated, except that 369.5 grams of $NaH_2PO_4$ and 132.5 grams of $Na_2HPO_4$ were added to the flavoring syrup. The resulting product contained 1.0 weight percent of total phosphate, dry basis, from a blend of 70% monosodium salt and 30% disodium salt.

It was observed in the product which was processed without phosphate that about 15% white uncooked grain centers were present. In addition, the untreated product tended to be sticky and lumpy after the steam cook and was difficult to transfer from the cooker, taking about 25 minutes of dump time. The product containing phosphate, however, was a nonsticky, free-flowing mass and the cooker was easily emptied in about 17 minutes. In addition, the proportion of the product with white uncooked centers was only about 7% less than half the control.

It has also been observed that the addition of inorganic orthophosphate to the sugar coating of a presweetened ready-to-eat breakfast cereal product is effective to control the caramelization and the degree of crystallization of such coating. It has been found, and forms yet another object of the present invention, that undesirable caramelization or lack thereof may be controlled and that an undesirable degree of crystallization of such sugar coatings may be retarded and controlled by the incorporation into syrup solutions used to form sugar-coatings of from about 0.5% to 1.5% of a member selected from the class consisting of $NaH_2PO_4$, $Na_2HPO_4$, and mixtures thereof. Specifically, the phosphate agent is added to a sugar solution of from about 65° to 100° Brix, which solution is thereafter employed to coat the breakfast cereal product, as will be apparent from the following examples.

Example XXVIII

A cereal dough was prepared by mixing 30 pounds of a 80% oat flour—20% corn flour blend with 15.9 pounds of a flavoring syrup having the following composition:

| | Percent |
|---|---|
| Water | 75.92 |
| Liquid sugar (69% solids) | 6.63 |
| Salt brine (saturated) | 17.38 |
| Color | 0.07 |

After thorough mixing, the material was extruded, pelletized to the desired letter form, and dried for 4 minutes at 260° F. The pellets were then tempered for about 20 minutes and puffed in a cereal puffing gun at 170 p.s.i. after preheating for 56 seconds at 350° F. Liquid brown sugar of 67.5° Brix was heated to 232° F. and poured over a 5-pound quantity of the puffs as prepared as described above. The puffs were allowed to tumble in a reel heated to 200° F. until they became free-running. The product was then dried for 4 minutes at 280° F.

The above example was repeated, except that 137.1 grams of $NaH_2PO_4$ and 170.9 grams of $Na_2HPO_4$ were added to the flavoring syrup used to prepare the cereal dough. In addition, 21.6 grams of $NaH_2PO_4$ and 7.8 grams of $Na_2HPO_4$ were added to the brown sugar syrup used to coat the puffs. The resulting product contained 1.0 weight percent of total phosphate, dry basis, from a blend of 47% monosodium salt and 53% disodium salt.

It was observed that the coating containing the phosphate did not crystallize as rapidly as the control coating and after drying the product developed a desirable glazed appearance instead of the frosty crystalline appearance of the control.

After subjecting the samples to storage tests, they were reevaluated. It was found that the phosphated sample had an attractive brown sugar odor and that the color difference was even more apparent, the phosphated sample presenting a more uniform golden brown appearance than the control. The effect of storage on the control sample had been to make the coating whiter and to reveal more of the color difference inherent in the base puffs which were used to make both samples.

Example XXIX

The following experiment was carried out to determine the effect of monosodium and disodium phosphates on the degree of caramelization of sugar solutions.

A sugar solution of 70% solids content was heated to 320° F. and poured into a tray to form a cake about ½ inch thick. Similar cakes were made containing 1.0% by weight, dry basis, of a phosphate blend comprising 76% $NaH_2PO_4$ and 24% $Na_2HPO_4$ and a blend of 47% monosodium salt and 53% disodium salt. Light was shined through the cakes and the color of each was compared. The control sample was found to be lightest, a yellow-brown color; the 76/24 blend was a rich amber color; and the 47/53 blend was dark brown. Disodium monohydrogen phosphate alone resulted in complete caramelization. The pH of a monosodium dihydrogen phosphate solution is about 4.5, while the pH of a disodium monohydrogen phosphate solution is about 9.2. It therefore appears that the degree of caramelization can be controlled by varying the proportions of mono- and disodium phosphates in the sugar solution.

It has also been observed that by incorporating inorganic orthophosphate in cereal dough that is puffed into ready-to-eat breakfast cereal, the puffing may be accomplished at lower pressures and a final product of more uniform density may be obtained. Specifically, it has been found, and forms yet another object of the present invention, that the addition to a puffed-type breakfast cereal product of from 0.5% to 1.5% by weight, based on the weight of the total cereal product, of a member selected from the class consisting of $NaH_2PO_4$, $Na_2HPO_4$, and mixtures thereof of from about 76% to about 47% monosodium salt and about 24% to about 76% disodium salt permits cereal puffing to be carried out at a lower pressure and produces a product of more uniform density, as illustrated in the following example.

Example XXX

A cereal dough was prepared by mixing 30 pounds of 80% oat flour—20% corn flour blend with 15.9 pounds of a flavoring syrup having the following composition:

| | Percent |
|---|---|
| Water | 75.92 |
| Liquid sugar (69% solids) | 6.63 |
| Salt brine (saturated) | 17.38 |
| Color | 0.07 |

After thorough mixing, the material was extruded, pelletized to the desired letter form, and dried for 4 minutes at 260° F. The pellets were then tempered for about 20 minutes. Following the tempering step, the pellets were introduced into a pressure vessel and sealed. The pressure in the vessel was then raised to 190 p.s.i.g. by admitting live steam at a temperature of 456° F., and the pressure was maintained for 10 seconds. The bottom of the vessel was then opened suddenly, discharging the pellets into an atmospheric expansion chamber where they expanded to about one-fourth the density of the charged pellets.

The above example was repeated three times, except that 0.2%, 0.9%, and 1.4% respectively by weight, dry basis, of a blend of 76% $NaH_2PO_4$ and 24% $Na_2HPO_4$ were added to the flavoring syrup used to prepare the cereal dough.

It was observed that the control samples without phosphates required a puffing pressure of about 190 p.s.i.g. After addition of the 0.2% level, puffing pressures required to maintain the density of the puffed product dropped to 185 p.s.i.g. Puffing pressures required for 0.9% sample were 180 p.s.i.g., as was the pressure needed for the 1.4% sample.

Example XXXI

Subsequently, tests were carried out in which the following samples of puffed oat product were prepared:

(1) Control sample with no phosphates added.
(2) Sample with 0.4% of $NaH_2PO_4$ by weight, dry basis.
(3) Sample with 0.4% of $Na_2HPO_4$ by weight, dry basis.
(4) Sample with 0.4% of a blend consisting of 50% monosodium salt, 50% disodium salt by weight, dry basis.
(5) Sample with 0.8% of a blend consisting of 50% $NaH_2PO_4$ and 50% $Na_2HPO_4$ phosphate by weight, dry basis.
(6) Sample with 1.2% of monosodium salt by weight, dry basis.
(7) Sample with 1.2% of disodium salt by weight, dry basis.

(8) Sample with 1.2% of a blend consisting of 50% monosodium salt and 50% disodium salt by weight, dry basis.

This investigation showed that the monosodium phosphate is more effective than the disodium phosphate. Reductions of 20 p.s.i.g. in puffing pressure, from that needed for the control sample, were achieved with the product containing 1.2% of monosodium phosphate. Disodium phosphate was found to be less effective since reductions of puffing pressure of only 5 p.s.i.g., from that needed for the control sample, were achieved. There appeared to be no synergistic action since the blends of mono- and disodium phosphate gave results intermediate between the results given by the individual salts.

It should be apparent to one skilled in the art that the above-disclosed teachings can be utilized to achieve the primary object of the described invention, namely, a comestible characterized by effective anticariogenicity, and also to achieve either cumulatively or independently one or more of the ancillary objects of that inherent in the subject invention, namely, a comestible characterized by oxidative stability, uniform cook and/or color characteristics, retarded sugar crystallization and/or controlled sugar caramelization, and/or lower puffing pressures and/or uniform density in the case of puffed comestibles such as a puffed ready-to-eat breakfast cereal.

Various changes and modifications may be effected in the details of formulation and in the manner of application of the various exemplary embodiments described herein without departing from the spirit or the scope of the subject application.

I claim:

1. In a process for producing a ready-to-eat breakfast cereal product, the improvement comprising incorporating an agent selected from the class consisting of $NaH_2PO_4$, $Na_2HPO_4$, and mixtures thereof into the cereal product in order to enhance the oxidative stability thereof, the said agent being provided at a level of at least about 0.5% up to about 1.5% by weight of the cereal product.

2. A process, as claimed in claim 1, wherein the agent is $Na_2HPO_4$.

3. A process, as claimed in claim 1, in which the agent is a mixture comprising about 76–47% $NaH_2PO_4$ by weight of the said mixture and about 24–53% $Na_2HPO_4$ by weight of the said mixture.

4. A process, as claimed in claim 1, wherein the breakfast cereal product is prepared from a member selected from the group consisting of cereal grains and cereal grain doughs that is cooked in the presence of a flavoring syrup and wherein the agent is incorporated into the breakfast cereal product during the cooking step in order to provide a more uniformly cooked and uniformly colored cereal product.

5. A process, as claimed in claim 1, in which the breakfast cereal product is provided with a sugar coating obtained by coating the cereal product with a sugar syrup and thereafter drying the coated product and wherein the agent is incorporated into the syrup prior to coating the cereal product in order to retard crystallization and control the degree of caramelization of the sugar coating.

6. A process, as claimed in claim 1, in which the breakfast cereal product is puffed from cereal dough in a cereal puffing gun and wherein the agent is added to the cereal product while in dough form in order to reduce the pressure needed to complete the puffing process and in order to obtain a breakfast cereal product having a more uniform density.

7. A process, as claimed in claim 1, wherein the agent is $NaH_2PO_4$.

8. A process, as claimed in claim 7, wherein the cereal product contains sugar.

9. A process, as claimed in claim 8, wherein a substantial portion of the sugar in the breakfast cereal product is provided in the form of a sugar coating and wherein at least a part of the $NaH_2PO_4$ is added in close proximity to the sugar coating.

10. A process, as claimed in claim 9, wherein at least a part of the $NaH_2PO_4$ is provided in coating form.

References Cited

UNITED STATES PATENTS

| 2,259,543 | 10/1941 | Billings | 99—83 |
| 2,198,205 | 4/1940 | Musber | 99—153 |

OTHER REFERENCES

McClure: "Journal of Dental Research," vol. 38, July-December 1959, pages 776–781.

Sobel: "Annuals New York Academy of Science," vol. 85, March 1960, pages 96–109.

RAYMOND N. JONES, Primary Examiner

U.S. Cl. X.R.

99—1, 28, 80, 81, 86, 100, 134, 135; 424—128